US010208542B2

(12) United States Patent
Khabashesku et al.

(10) Patent No.: US 10,208,542 B2
(45) Date of Patent: *Feb. 19, 2019

(54) POLYCRYSTALLINE COMPACTS, EARTH-BORING TOOLS INCLUDING SUCH COMPACTS, AND METHODS OF FABRICATING POLYCRYSTALLINE COMPACTS

(71) Applicant: Baker Hughes Incorporated, Houston, TX (US)

(72) Inventors: Valery N. Khabashesku, Houston, TX (US); Vladimir P. Filonenko, Moscow (RU)

(73) Assignee: Baker Hughes Incorporated, Houston, TX (US)

( * ) Notice: Subject to any disclaimer, the term of this patent is extended or adjusted under 35 U.S.C. 154(b) by 225 days.

This patent is subject to a terminal disclaimer.

(21) Appl. No.: 15/297,882

(22) Filed: Oct. 19, 2016

(65) Prior Publication Data

US 2017/0037688 A1    Feb. 9, 2017

Related U.S. Application Data

(63) Continuation of application No. 14/090,018, filed on Nov. 26, 2013, now Pat. No. 9,498,867.

(51) Int. Cl.
   *E21B 10/56*      (2006.01)
   *B22F 3/14*       (2006.01)
   (Continued)

(52) U.S. Cl.
   CPC .............. *E21B 10/567* (2013.01); *B24D 3/06* (2013.01); *B24D 18/0009* (2013.01)

(58) Field of Classification Search
   CPC .......... E21B 10/46; E21B 10/52; E21B 10/55; E21B 10/56; B22F 3/14; B24D 3/06; B24D 3/08; B24D 3/10
   (Continued)

(56) References Cited

U.S. PATENT DOCUMENTS 3,852,078 A    12/1974    Wakatsuki et al.
4,132,554 A    1/1979     Saito et al.
(Continued)

FOREIGN PATENT DOCUMENTS

EP    0699642 A2       3/1996
WO    2009132167 A1    10/2009

OTHER PUBLICATIONS

International Preliminary Report on Patentability for International Application No. PCT/US2014/067929 dated May 31, 2016, 11 pages.

(Continued)

*Primary Examiner* — Kenneth L Thompson
(74) *Attorney, Agent, or Firm* — TraskBritt

(57) ABSTRACT

A polycrystalline compact includes diamond, cubic boron nitride, and at least one hard material, which may be aluminum nitride, gallium nitride, silicon nitride, titanium nitride, silicon carbide, titanium carbide, titanium boride, titanium diboride, and/or aluminum boride. The diamond, the cubic boron nitride, and the hard material are intermixed and interbonded to form a polycrystalline material. An earth-boring tool includes a bit body and a polycrystalline diamond compact secured to the bit body. Methods of fabricating polycrystalline compacts include forming a mixture comprising diamond, non-cubic boron nitride, and a metal or semimetal; encapsulating the mixture in a container; and subjecting the encapsulated mixture to high-pressure and high-temperature conditions to form a polycrystalline material.

18 Claims, 5 Drawing Sheets

(51) Int. Cl.
*E21B 10/567* (2006.01)
*B24D 3/06* (2006.01)
*B24D 18/00* (2006.01)

(58) Field of Classification Search
USPC .......................................................... 51/309
See application file for complete search history.

(56) References Cited

U.S. PATENT DOCUMENTS

| | | | |
|---|---|---|---|
| 4,311,490 | A | 1/1982 | Bovenkerk et al. |
| 4,525,179 | A | 6/1985 | Gigl |
| 4,906,528 | A | 3/1990 | Cerceau et al. |
| 5,326,380 | A * | 7/1994 | Yao .......................... B24D 3/06 501/87 |
| 5,510,193 | A | 4/1996 | Cerutti et al. |
| 5,624,756 | A | 4/1997 | Ueda et al. |
| 5,629,053 | A | 5/1997 | Treichel et al. |
| 5,662,720 | A | 9/1997 | O'Tighearnaigh |
| 6,090,343 | A | 7/2000 | Kear et al. |
| 6,214,079 | B1 | 4/2001 | Kear et al. |
| 6,447,852 | B1 | 9/2002 | Gordeev et al. |
| 6,544,308 | B2 | 4/2003 | Griffin et al. |
| 7,753,143 | B1 | 7/2010 | Miess et al. |
| 7,806,206 | B1 | 10/2010 | Miess |
| 7,828,088 | B2 | 11/2010 | Middlemiss et al. |
| 8,426,330 | B2 | 4/2013 | Andrews et al. |
| 8,449,854 | B2 | 5/2013 | Khabashesku et al. |
| 8,579,052 | B2 | 11/2013 | Digiovanni et al. |
| 9,498,867 | B2 * | 11/2016 | Khabashesku ........ E21B 10/567 |
| 2005/0210755 | A1 | 9/2005 | Cho et al. |
| 2007/0193782 | A1 | 8/2007 | Fang et al. |
| 2008/0085407 | A1 | 4/2008 | Cooley et al. |
| 2012/0032116 | A1 | 2/2012 | Khabashesku et al. |
| 2012/0211284 | A1 | 8/2012 | Digiovanni |
| 2012/0222364 | A1 | 9/2012 | Lyons et al. |
| 2013/0228383 | A1 | 9/2013 | Mukhopadhyay et al. |
| 2015/0144407 | A1 | 5/2015 | Khabashesku et al. |

OTHER PUBLICATIONS

International Search Report for International Application No. PCT/US2014/067929 dated Mar. 27, 2015, 3 pages.
International Written Opinion for International Application No. PCT/US2014/067929 dated Mar. 27, 2015, 10 pages.
Khvostantsev et al., "Toroid Type High-Pressure Device: History and Prospects," High Pressure Research, vol. 24, No. 3, (Sep. 2004), pp. 371-383.
Tani et al., "A Stability of Wurtzite Type Boron Nitride Under High Pressure", Japan, J. Appl. Phys. vol. 14, No. 10, (1975), pp. 1605-1606.
Underwood, Ervin E., Quantitative Stereology, Addison-Wesley Publishing Company, Inc., (1970), pp. 103-105.
European Search Report and Opinion for European Application No. 14865399 dated Jul. 7, 2016, 9 pages.
Written Opinion for International Application No. PCT/US2014/067608 dated Mar. 11, 2015; 9 pages.
International Search Report for International Application No. PCT/US2014/067608 dated Mar. 11, 2015; 3 pages.

* cited by examiner

POLYCRYSTALLINE COMPACTS, EARTH-BORING TOOLS INCLUDING SUCH COMPACTS, AND METHODS OF FABRICATING POLYCRYSTALLINE COMPACTS

CROSS-REFERENCE TO RELATED APPLICATION

This application is a continuation of U.S. patent application Ser. No. 14/090,018, filed Nov. 26, 2013, now U.S. Pat. 9,498,867, issued Nov. 22, 2016, the disclosure of which is hereby incorporated herein in its entirety by this reference.

FIELD

Embodiments of the present disclosure relate generally to polycrystalline compacts and methods of forming polycrystalline compacts, which may be used, for example, as cutting elements for earth-boring tools.

BACKGROUND

Earth-boring tools for forming wellbores in subterranean earth formations may include a plurality of cutting elements secured to a body. For example, fixed-cutter earth-boring rotary drill bits (also referred to as "drag bits") include a plurality of cutting elements fixedly attached to a bit body of the drill bit. Similarly, roller cone earth-boring rotary drill bits include cones mounted on bearing pins extending from legs of a bit body such that each cone is capable of rotating about the bearing pin on which the cone is mounted. A plurality of cutting elements may be mounted to each cone of the drill bit.

The cutting elements used in such earth-boring tools often include polycrystalline diamond cutters (often referred to as "PDCs"), which are cutting elements that include a polycrystalline diamond (PCD) material. Such polycrystalline diamond cutting elements are formed by sintering and bonding together relatively small diamond grains or crystals under conditions of high temperature and high pressure in the presence of a catalyst (such as cobalt, iron, nickel, or alloys and mixtures thereof) to form a layer of polycrystalline diamond material on a cutting element substrate. These processes are often referred to as "high-pressure, high-temperature" (or "HPHT") processes. The cutting element substrate may be a cermet material (i.e., a ceramic-metal composite material) such as cobalt-cemented tungsten carbide. In such instances, the cobalt or other catalyst material in the cutting element substrate may be drawn into the diamond grains or crystals during sintering and serve as a catalyst material for forming a diamond table from the diamond grains or crystals. In other methods, powdered catalyst material may be mixed with the diamond grains or crystals prior to sintering the grains or crystals together in an HPHT process.

Cobalt, which is commonly used in sintering processes to form PCD material, melts at about 1,495° C. The melting temperature may be reduced by alloying cobalt with carbon or another element, so HPHT sintering of cobalt-containing bodies may be performed at temperatures above about 1,450° C.

Upon formation of a diamond table using an HPHT process, catalyst material may remain in interstitial spaces between the grains or crystals of diamond in the resulting polycrystalline diamond table. The presence of the catalyst material in the diamond table may contribute to thermal damage in the diamond table when the cutting element is heated during use, which heating is caused by friction at the contact point between the cutting element and the formation. Polycrystalline diamond cutting elements in which the catalyst material remains in the diamond table are generally thermally stable up to temperatures of about 750° C., although internal stress within the polycrystalline diamond table may begin to develop at temperatures exceeding about 350° C. This internal stress is at least partially due to differences in the rates of thermal expansion between the diamond table and the cutting element substrate to which it is bonded. For example, diamond has a linear thermal expansion coefficient (TEC) at 25° C. of about $0.8 \cdot 10^{-6} K^{-1}$, whereas cobalt has a TEC at 25° C. of about $12 \cdot 10^{-6} K^{-1}$. At 800° C., diamond has a TEC of about $4.5 \cdot 10^{-6} K^{-1}$, and cobalt has a TEC of about $17.0 \cdot 10^{-6} K^{-1}$. At temperatures of about 750° C. and above, stresses within the diamond table may increase significantly due to differences in the coefficients of thermal expansion of the diamond material and the catalyst material within the diamond table itself. For example, cracks may form and propagate within a diamond table including cobalt, eventually leading to deterioration of the diamond table and ineffectiveness of the cutting element. Besides being a source of thermomechanically initiated stresses, catalyst materials used to form polycrystalline diamond can also catalyze the phase transformation of diamond into graphite (commonly referred to as "reverse graphitization"), which contributes to degradation of diamond tables.

To reduce the problems associated with catalyst material (e.g., different rates of thermal expansion in polycrystalline-diamond cutting elements and reverse graphitization), so-called "thermally stable" polycrystalline diamond cutting elements have been developed. Such a thermally stable polycrystalline-diamond cutting element may be formed by leaching the catalyst material (e.g., cobalt) out from interstitial spaces between the diamond grains in the diamond table using, for example, an acid. All of the catalyst material may be removed from the diamond table, or only a portion may be removed. Thermally stable polycrystalline diamond cutting elements in which substantially all catalyst material has been leached from the diamond table have been reported to be thermally stable up to temperatures of about 1,200° C. It has also been reported, however, that fully leached diamond tables are relatively more brittle and vulnerable to shear, compressive, and tensile stresses than are non-leached diamond tables. In an effort to provide cutting elements having diamond tables that are more thermally stable relative to non-leached diamond tables, but that are also relatively less brittle and vulnerable to shear, compressive, and tensile stresses relative to fully leached diamond tables, cutting elements have been provided that include a diamond table in which only a portion of the catalyst material has been leached from the diamond table.

BRIEF SUMMARY

In some embodiments, a polycrystalline compact includes diamond grains, cubic boron nitride grains, and grains of an additional nitride, carbon or boride. The additional nitride, carbide, or boride may be aluminum nitride, gallium nitride, silicon nitride, titanium nitride, silicon carbide, titanium carbide, titanium boride, titanium diboride, and/or aluminum boride. The diamond grains, the cubic boron nitride grains, and the grains of the additional nitride, carbide, or boride are intermixed and interbonded to form a polycrystalline material.

An earth-boring tool includes a bit body and a polycrystalline diamond compact secured to the bit body. The polycrystalline diamond compact includes diamond grains, cubic boron nitride grains, and grains of an additional nitride, carbide, or boride. The additional nitride, carbide, or boride may be aluminum nitride, gallium nitride, silicon nitride, titanium nitride, silicon carbide, titanium carbide, titanium boride, titanium diboride, and/or aluminum boride. The diamond grains, the cubic boron nitride grains, and the grains of the additional nitride, carbide, or boride are intermixed and interbonded to form a polycrystalline material.

In certain embodiments, a method of fabricating a polycrystalline compact includes forming a mixture comprising diamond grains, non-cubic boron nitride grains, and a metal or semimetal; encapsulating the mixture in a container; and subjecting the encapsulated mixture to a pressure of at least 5.0 GPa and a temperature of at least 1,100° C. to form a polycrystalline material from the mixture. The polycrystalline material comprises the diamond grains, cubic boron nitride grains formed from the non-cubic boron nitride grains, and grains of an additional nitride, carbide, or boride selected from the group consisting of aluminum nitride, gallium nitride, silicon nitride, titanium nitride, silicon carbide, titanium carbide, titanium boride, titanium diboride, and aluminum boride. The diamond grains, the cubic boron nitride grains, and the grains of the additional nitride, carbide, or boride are intermixed and interbonded within the polycrystalline material.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments when read in conjunction with the accompanying drawings, in which:

DETAILED DESCRIPTION

Figure 1:
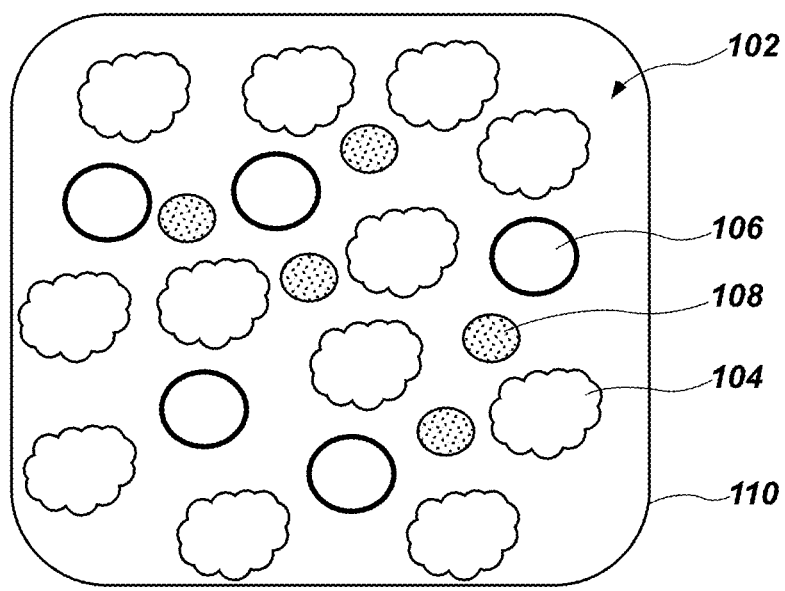
FIG. 1 is a simplified illustration showing a mixture for use in forming a polycrystalline compact according to the present disclosure.

The illustrations presented herein are not meant to be actual views of any particular material, apparatus, system, or method, but are merely idealized representations employed to describe certain embodiments. For clarity in description, various features and elements common among the embodiments may be referenced with the same or similar reference numerals.

As used herein, the term "drill bit" means and includes any type of bit or tool used for drilling during the formation or enlargement of a wellbore and includes, for example, rotary drill bits, percussion bits, core bits, eccentric bits, bicenter bits, reamers, expandable reamers, mills, drag bits, roller cone bits, hybrid bits, and other drilling bits and tools known in the art.

The term "polycrystalline material" means and includes any material comprising a plurality of grains (i.e., crystals) of the material that are bonded directly together by inter-granular bonds. The crystal structures of the individual grains of the material may be randomly oriented in space within the polycrystalline material.

As used herein, the term "inter-granular bond" means and includes any direct atomic bond (e.g., ionic, covalent, metallic, etc.) between atoms in adjacent grains of material.

As used herein, the term "grain size" means and includes a geometric mean diameter of grains measured from a two-dimensional section through a bulk polycrystalline material. The geometric mean diameter of grains may be determined using techniques known in the art, such as those set forth in Ervin E. Underwood, QUANTITATIVE STEREOLOGY, 103-105 (Addison-Wesley Publishing Company, Inc., 1970), the disclosure of which is incorporated herein in its entirety by this reference.

As used herein, the term "particle size" means and includes a largest linear dimension of a particle (sometimes referred to as "diameter"). As used herein, "average particle size" refers to the number average particle size based on the largest linear dimension of a group of particles. Particle size, including average, maximum, and minimum particle sizes, may be determined by an appropriate method of sizing particles such as, for example, static or dynamic light scattering (SLS or DLS) using a laser light source, physical classification such as screening, or any other appropriate method. Accurate measurement of particle sizes may depend on the size range of the particles to be measured.

FIG. 1 is a simplified illustration showing a mixture 102 for use in forming a polycrystalline compact. The mixture 102 includes diamond grains 104, boron nitride grains 106, and a metal or semimetal 108.

The diamond grains 104 may be any suitable type and form of diamond, including natural and synthetic diamonds. The diamond grains 104 may include, for example, micron-size diamond having an average particle size from about 1 µm to about 40 µm, such as from about 5 µm to about 30 µm, or from about 7 µm to about 10 µm. The diamond grains 104 may be natural or synthetic, and may be formed and/or classified by any appropriate methods.

The diamond grains 104 may be monodisperse (i.e., all particles are of substantially the same size with little variation) or polydisperse (i.e., the particles have a range or distribution of sizes). Diamond grains 104 of different average particle size, monodisperse or polydisperse, or both, may be used, and the particle size distribution of the micron diamonds may be unimodal, bimodal, or multi-modal. In some embodiments, the diamond grains 104 may be or include nanometer-size diamond having an average particle size from about 50 nm to about 1 µm. Diamond grains 104 may be used as received, or may be sorted and cleaned by various methods to remove contaminants and non-diamond carbon phases that may be present, such as residues of amorphous carbon or graphite. The diamond grains 104 may comprise, for example, from about 80% to about 95% by weight of the mixture 102.

The boron nitride grains 106 may be in any selected form, such as in an amorphous or crystalline form. For example, the boron nitride grains 106 may be in a non-cubic form. The boron nitride grains 106 may be in a wurtzitic crystalline form, a form of boron nitride having a hexagonal structure, which may be referred to as "w-BN." The boron nitride grains 106 may include, for example, submicron and/or micron-size boron nitride having an average particle size from about 0.1 μm to about 40 μm, such as from about 5 μm to about 30 μm, or from about 7 μm to about 10 μm. The boron nitride grains 106 may be selected to be approximately the same size as the diamond grains 104. The boron nitride grains 106 may comprise, for example, from about 5% to about 30% by weight of the mixture 102, such as from about 10% to about 20% by weight.

The metal or semimetal 108 may be, for example, aluminum, gallium, silicon, or titanium, or combinations, oxides, or alloys thereof. For example, if the metal or semimetal 108 includes aluminum, the aluminum may include a coating of aluminum oxide. The metal or semimetal 108 may be selected to be substantially free of cobalt, iron, or nickel. Cobalt, iron, and nickel, though commonly used in PDC manufacture, tend to cause instabilities at high temperatures encountered in drilling operations. The metal or semimetal 108 may be selected to have a melting temperature under pressure below about 1,200° C., such as below about 1,000° C., or even below about 800° C. The metal or semimetal 108 may be in a particulate form, such as a powder, having an average particle size in the micron or nanometer range. For example, the metal or semimetal 108 may be in the form of particles have an average particle size between about 50 nm and about 1 μm, such as between about 100 nm and about 500 nm. The metal or semimetal 108 may comprise, for example, from about 1% to about 10% by weight of the mixture 102, such as from about 2% to about 5% by weight.

The mixture 102 may be processed in preparation for subjecting the mixture 102 to an HPHT sintering process. For example, a slurry may be prepared that includes the mixture 102 by adding one or more of methanol, ethanol, isopropanol, acetone, hexane, water, or any other appropriate liquid to the mixture 102. The slurry may be used to improve the homogeneity of the mixture 102 (i.e., the uniformity of the distribution of the different components of the mixture 102). Ultrasonic energy optionally may be imparted to the slurry to further improve the homogeneity of the mixture 102. In some embodiments, the mixture 102 may be mechanically mixed without any added liquid. The mixture 102 may be mixed in an apparatus for grinding or crushing. For example, the mixture 102 may be mixed with a mortar and pestle, with a stir bar in a flask, or with a production-scale mechanical mixing apparatus.

To form a compact 116 (see FIG. 2), the diamond grains 104, the boron nitride grains 106, and the metal or semimetal 108 may be placed in a container 110 before, during, or after forming the mixture 102. For example, the container 110 may be a piston-cylinder chamber, a pair of Bridgeman anvils, a belt apparatus, a multi-anvil apparatus, or a toroid-type high-pressure device. Such devices are described in, for example, L. G. Khvostantsev et al., "Toroid Type High-Pressure Device: History and Prospects," High Pressure Research, vol. 24, No. 3, pp. 371-83 (September 2004), the entire contents of which are incorporated herein by this reference.

Figure 2:
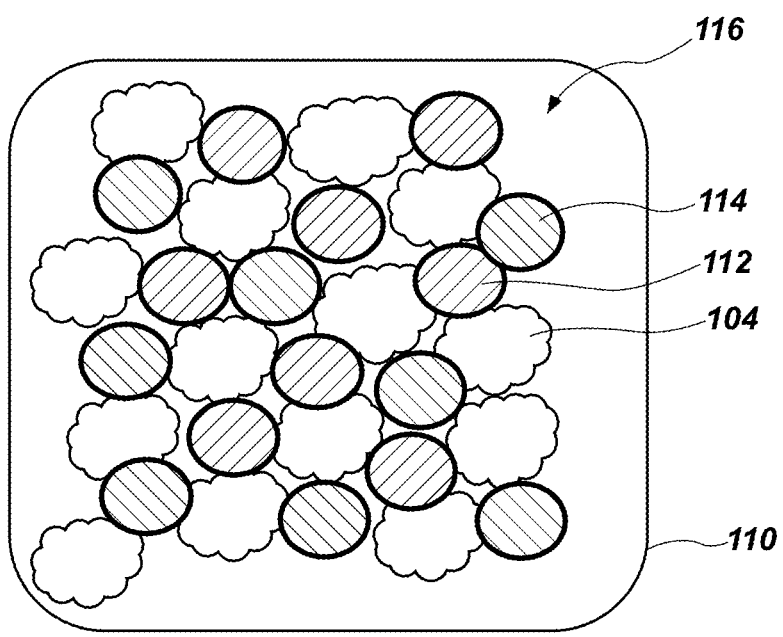
FIG. 2 is a simplified illustration showing the mixture of FIG. 1 after HPHT sintering.

The mixture 102 may be subjected to HPHT conditions (e.g., sintered) to form a compact 116 having inter-granular bonds between the diamond grains 104 and to form grains of an additional nitride, boride, or carbide 114, as shown in FIG. 2. HPHT conditions may also cause the compaction of the materials and the conversion of at least a portion of the boron nitride grains 106 from a non-cubic form to cubic boron nitride grains 112. The grains of additional nitride, boride, or carbide 114 and/or the cubic boron nitride grains 112 may help bind the diamond grains 104 together, and may fill voids between the diamond grains 104. Thus, the compact 116 may have a higher density than the mixture 102 before sintering.

In some embodiments, the mixture 102 may be subjected to a pressure from about 5.0 GPa to about 10.0 GPa, such as from 7.0 GPa to about 9.0 GPa, or a pressure of at least about 7.5 GPa. The mixture 102 may be subjected to a temperature from about 1,100° C. to about 1,900° C., such as a temperature from about 1,200° C. to about 1,800° C. or a temperature of at least about 1,400° C. The time during which the HPHT conditions are maintained may vary based on the temperature, pressure, volume and composition of material, or other factors. In some embodiments, the HPHT conditions may be maintained for a time period from about 1 second to about 5 minutes. For example, HPHT conditions may be maintained for a time period from about 5 seconds to about 1 minute. The pressure, temperature, and time of HPHT processing may affect the final density and other properties of the compact 116.

In some embodiments, the metal or semimetal 108 may melt before the final temperature of the HPHT sintering process is reached, and may melt before the graphitization of diamond occurs. The metal or semimetal 108 in its liquid state may wet the surface of the diamond grains 104 and particles of boron nitride grains 106. The metal or semimetal 108 may facilitate efficient densification of the compact 116. As a result, a graphite phase, which causes weakening of the compact 116, may not be formed under these conditions. The metal or semimetal 108 may flow within the mixture 102, allowing the diamond grains 104 and/or the boron nitride grains 106 to rearrange relative to one another, increasing the packing fraction and the density of the compact 116 to be formed. For example, aluminum melts at a temperature of about 660° C., silicon melts at about 1,412° C., and titanium melts at about 1,668° C. Gallium is a liquid at room temperature, so if gallium is used, it may be liquid during formation of the mixture 102. Thus, the metal or semimetal 108 may be in a liquid state during at least part of time while the mixture 102 is brought to HPHT conditions.

During HPHT processing, the grains of additional nitride, boride, or carbide 114 may be formed by the reaction of nitrogen in the boron nitride grains 106 with the metal or semimetal 108 in the mixture 102. For example, if the metal or semimetal 108 is aluminum, aluminum nitride, cubic boron nitride, and boron may form according to the following reaction:

$$2w\text{-}BN + Al \rightarrow c\text{-}BN + AlN + B.$$

Thus, a portion of the nitrogen and boron in the boron nitride may bind to the aluminum. Boron can also react chemically with the diamond to form a carbide such as $B_4C$. When an aluminum-titanium powder mixture or alloy is used in the process of HPHT sintering with diamond, aluminum nitride (AlN), titanium diboride ($TiB_2$), and titanium carbide (TiC) may be formed. Metals, semi-metals, and their mixtures and alloys are specially selected in order to yield, after the HPHT process, compacts containing diamond and nitrides, borides and/or carbides. The compacts may be substantially free of materials having melting temperatures lower than about 2,000° C. Such compacts may have relatively high mechanical strength in comparison with conventional compacts, and may have a TEC nearer the TEC of diamond at temperatures in a range from about 700° C. to about 1,000° C. In some embodiments, an unreacted portion of the metal or semimetal 108 may remain as elemental metal or semimetal, may physically flow from the compact 116, and may be removed. Furthermore, remaining portions of the metal or semimetal 108 may be removed by chemical means, such as leaching, etc.

Figure 3:
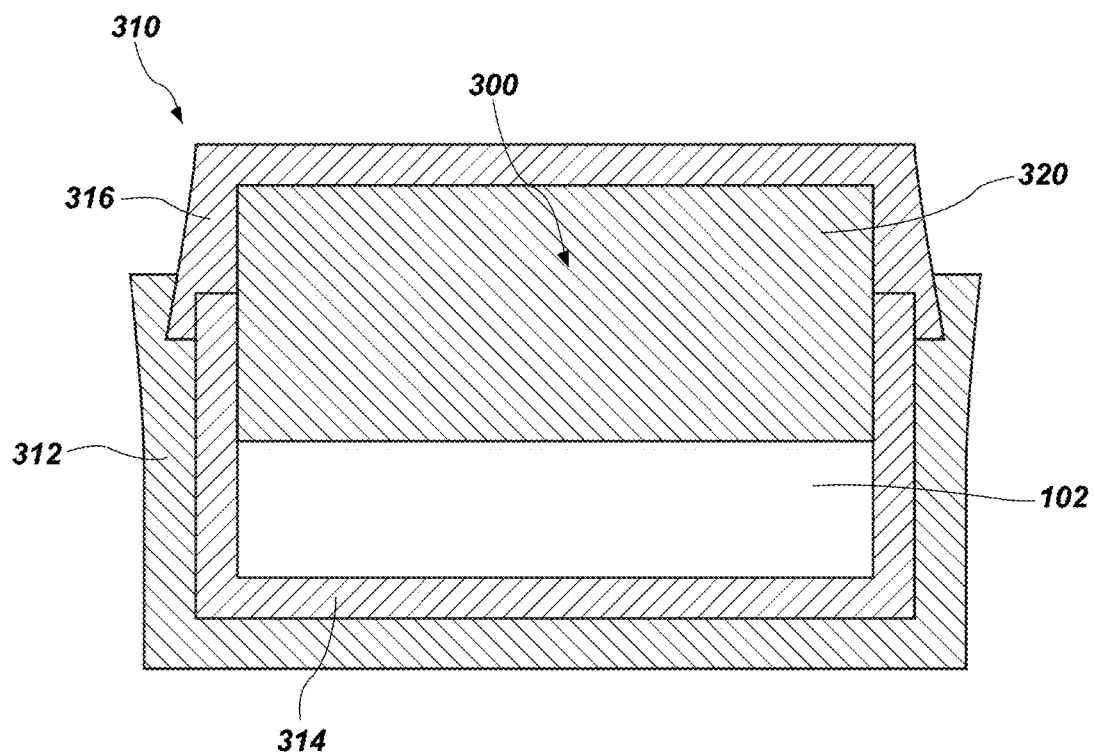
FIG. 3 is a simplified illustration showing the mixture of FIG. 1 in a canister for HPHT sintering.

In some embodiments, the container 110 may be a canister used for HPHT processing to form polycrystalline compacts, such as a container 310, as shown in FIG. 3. The container 310 may include one or more generally cup-shaped members, such as a cup-shaped member 312, a cup-shaped member 314, and a cup-shaped member 316, which may be assembled and swaged and/or welded together to form the container 310. The mixture 102 and an optional cutting element substrate 320 may be disposed within the inner cup-shaped member 314, which has a circular end wall and a generally cylindrical lateral side wall extending perpendicularly from the circular end wall, such that the inner cup-shaped member 314 is generally cylindrical and includes a first closed end and a second, opposite open end.

After providing the mixture 102 and, if present, the cutting element substrate 320, within the container 310, the assembly may optionally be subjected to a cold pressing process to compact the powder mixture 102 to form an unsintered preform 300. The unsintered preform 300 may then be subjected to HPHT conditions as described above.

The processes disclosed herein may be used to form polycrystalline compacts of cutting elements. The use of a metal or semimetal (e.g., aluminum, silicon, etc.) and wurtzitic boron nitride as additives to diamond crystals in HPHT sintering processes may provide a new class of superhard polycrystalline materials having advanced physical and mechanical properties and improved work efficiency in cutting applications.

Figure 4:
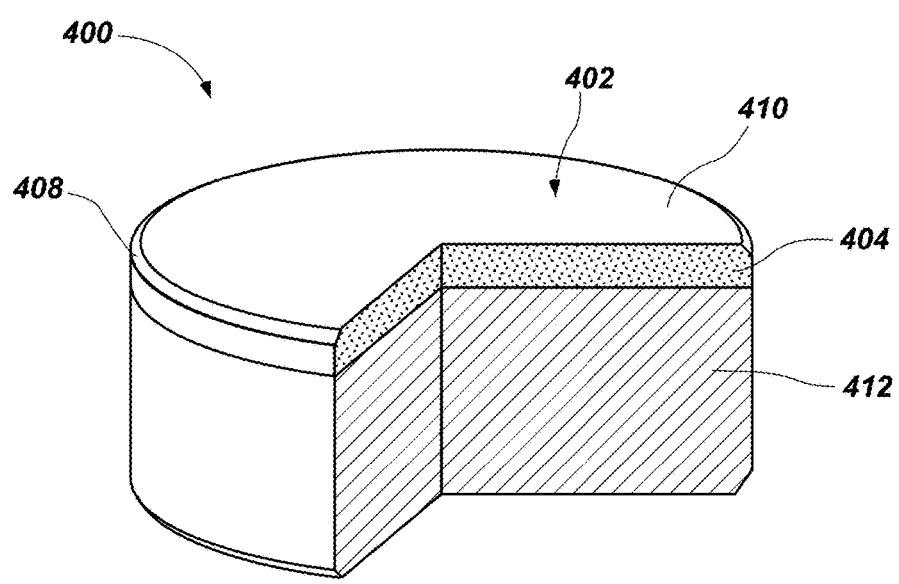
FIG. 4 shows a partial cutaway illustration of a polycrystalline compact according to the present disclosure.

As shown in FIG. 4, a cutting element 400 has a generally cylindrical, or disk-shaped, configuration. An exposed, major surface of a hard polycrystalline material 410, which major surface may or may not be planar as depicted, defines a cutting face 402 of the cutting element 400. A lateral side surface 404 of the hard polycrystalline material 410 extends from the cutting face 402 of the hard polycrystalline material 410 to the cutting element substrate 412 on a lateral side of the cutting element 400. While a planar interface is depicted between the hard polycrystalline material 410 and cutting element substrate 412, non-planar interfaces of varying configurations and complexity are conventional and within the scope of the present disclosure. In the embodiment shown in FIG. 4, the hard polycrystalline material 410 may comprise a generally planar table that extends to and is exposed at the lateral side surface 404 of the cutting element 400. For example, a lower portion of the lateral side surface 404 of the hard polycrystalline material 410 may have a generally cylindrical shape, and an upper portion of a lateral side surface 404 of the polycrystalline compact adjacent the cutting face 402 may have an angled, frustoconical shape and may define or include, for example, one or more chamfer surfaces 408 of the cutting element 400.

The hard polycrystalline material 410 may include diamond grains 104, cubic boron nitride grains 112, and grains of additional nitride, boride, or carbide 114 (see FIG. 2), as described above. The diamond grains 104 may be monodisperse or polydisperse. The diamond grains 104 may be micron-size diamond having a grain size from about 1 μm to about 40 μm, such as from about 5 μm to about 30 μm, or from about 7 μm to about 10 μm. In some embodiments, the diamond grains 104 may be or include nanometer-size diamond having a grain size from about 50 nm to about 1 μm. Diamond grains 104 of different average particle size, monodisperse or polydisperse, or both, may be present in the hard polycrystalline material 410, and the particle size distribution of the micron diamonds may be unimodal, bimodal, or multi-modal. The diamond grains 104 may comprise, for example, from about 70% to about 90% by weight of the hard polycrystalline material 410.

The cubic boron nitride grains 112 may include, for example, micron-size cubic boron nitride having a grain size from about 1 μm to about 40 μm, such as from about 5 μm to about 30 μm, or from about 7 μm to about 10 μm. The cubic boron nitride grains 112 may be approximately the same size as the diamond grains 104 or may be of a different size than the diamond grains 104. The cubic boron nitride grains 112 may comprise, for example, from about 5% to about 30% by weight of the hard polycrystalline material 410, such as from about 10% to about 15% by weight.

Overall, the hard polycrystalline material 410 may include from about 65 atomic percent to about 95 atomic percent carbon, such as from about 70 atomic percent to about 90 atomic percent carbon, or from about 75 atomic percent to about 85 atomic percent carbon. The hard polycrystalline material 410 may include from about 3 atomic percent to about 15 atomic percent boron, such as from about 5 atomic percent to about 10 atomic percent boron, or from about 8 atomic percent to about 12 atomic percent boron. The hard polycrystalline material 410 may include from about 3 atomic percent to about 15 atomic percent nitrogen, such as from about 5 atomic percent to about 10 atomic percent nitrogen, or from about 8 atomic percent to about 12 atomic percent nitrogen. The hard polycrystalline material 410 may include from about 0.05 atomic percent to about 5.0 atomic percent aluminum, gallium, silicon, or titanium, such as from about 0.1 atomic percent to about 2.5 atomic percent, or from about 0.25 atomic percent to about 1.0 atomic percent.

The grains of the additional nitride, boride, or carbide 114 may be, for example, aluminum nitride, gallium nitride, silicon nitride, titanium nitride, silicon carbide, titanium carbide, titanium boride, titanium diboride, or aluminum boride, or combinations thereof. The grains of the additional nitride, boride, or carbide 114 may have a linear TEC of less than about $5.0 \cdot 10^{-6} K^{-1}$. The grains of the additional nitride, boride, or carbide 114 may comprise, for example, aluminum nitride, which has a linear TEC of about $4.6 \cdot 10^{-6} K^{-1}$. The hard polycrystalline material 410 may be substantially free of materials having a linear TEC of greater than about $5.0 \cdot 10^{-6} K^{-1}$. For example, the hard polycrystalline material 410 may be substantially free of any metal phase comprising cobalt, iron, nickel, or alloys thereof.

The hard polycrystalline material 410 may have a density near the density of diamond (3.52 g/cm$^3$). For example, the hard polycrystalline material 410 may have a density of at least about 3.30 g/cm$^3$, at least about 3.40 g/cm$^3$, or even at least about 3.45 g/cm$^3$. The Young's modulus of the hard polycrystalline material 410 may also be comparable to diamond. In some embodiments, the Young's modulus of the hard polycrystalline material 410 may be at least about 700 GPa, at least about 800 GPa, or even at least about 900 GPa.

Figure 5:
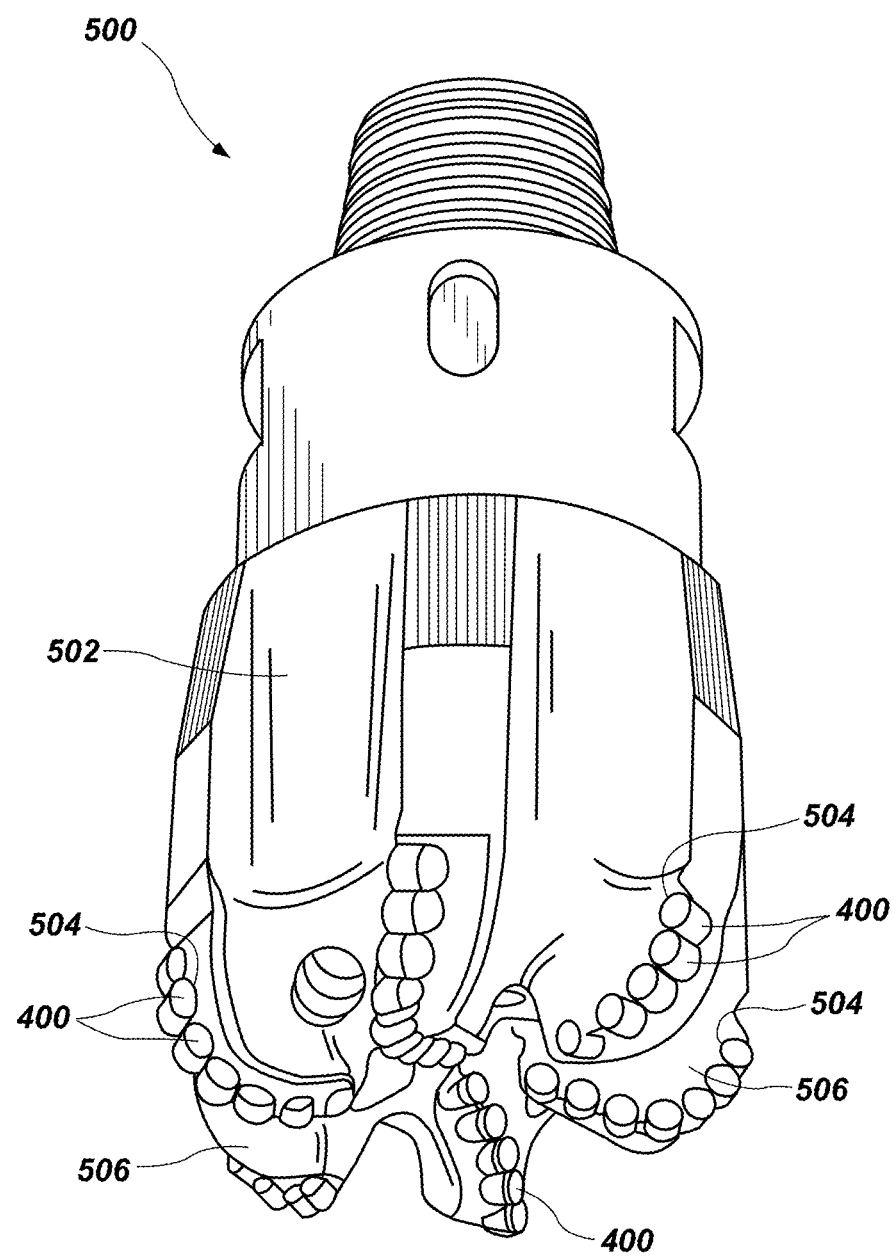
FIG. 5 illustrates a fixed-cutter type earth-boring rotary drill bit that includes a plurality of cutting elements, such as the polycrystalline compact shown in FIG. 4.

Embodiments of cutting elements and polycrystalline materials (e.g., compacts) of the invention, such as the cutting element 400 and the hard polycrystalline material 410 described with reference to FIG. 4, may be formed and secured to earth-boring tools for use in forming wellbores in subterranean formations. As a non-limiting example, FIG. 5 illustrates a fixed-cutter earth-boring rotary drill bit 500 that includes a plurality of cutting elements 400 as previously described herein. The rotary drill bit 500 includes a bit body 502, and the cutting elements 400 are secured to the bit body 502. The cutting elements 400 may be brazed (or otherwise secured) within pockets 504 formed in the outer surface of each of a plurality of blades 506 of the bit body 502.

Cutting elements and polycrystalline compacts as described herein may be secured to and used on other types of earth-boring tools, including, for example, roller cone drill bits, percussion bits, core bits, eccentric bits, bicenter bits, reamers, expandable reamers, mills, hybrid bits, and other drilling bits and tools known in the art.

EXAMPLE

A mixture was prepared by mixing 85% by weight of diamond grains (e.g., grit) having an average particle size of 7 µm to 10 µm with 12% by weight of wurtzitic boron nitride grains (w-BN) having an average particle size of 1 µm to 3 µm and 3% by weight of aluminum powder having an average particle size of about 1 µm in ethanol. The mixture was placed in a container in an ultrasonic bath, and was subjected to ultrasonic energy for 30 minutes. The container was then removed from the bath, and the ethanol was evaporated. The dried mixture was transferred into a toroid high-pressure device, as described in, Khvostantsev et al., supra. The dried mixture was sintered at a temperature of 1,500° C. under a pressure of 8 GPa applied for 5 seconds to 30 seconds. The chamber of the toroid-type high-pressure device was then quenched to ambient conditions. This process yielded polycrystalline compact samples in the form of disks approximately 4-mm diameter and 3-mm thick.

Figure 6:
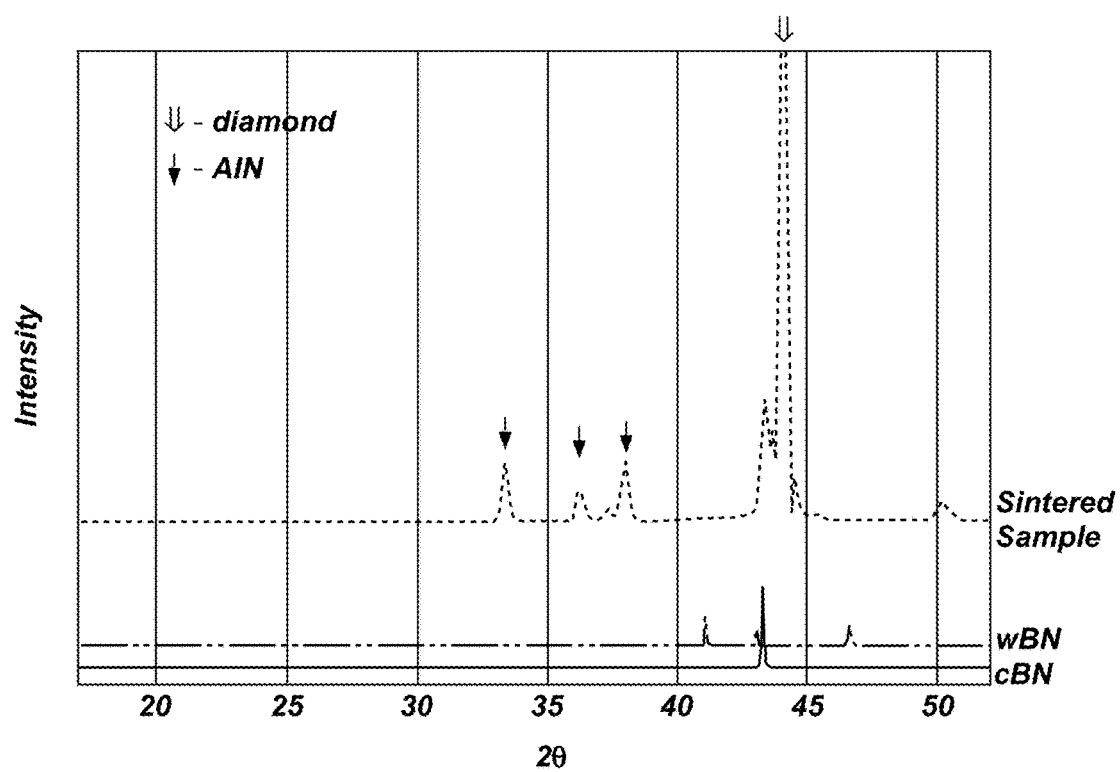
FIG. 6 illustrates X-ray diffraction (XRD) analysis of a polycrystalline compact according to the present disclosure.

A sample of a polycrystalline compact sintered for 7 seconds at 1,500° C. under a pressure of 8 GPa was split lengthwise. X-ray diffraction (XRD) analysis was performed on the resulting surface, and the spectrum is shown in FIG. 6. The XRD data indicate the presence of diamond, aluminum nitride (AlN), and cubic boron nitride (c-BN) in the PDC. The peaks associated with w-BN do not appear in the XRD spectrum of the sintered sample. Thus, the AN and c-BN appear to have been formed during the sintering process from the Al and the w-BN.

Figure 7:
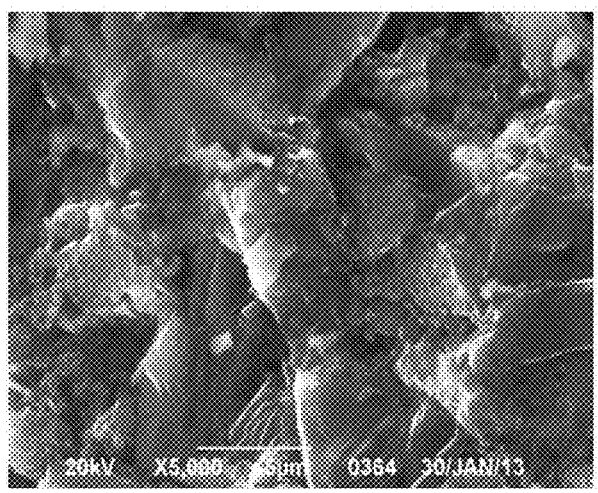
FIGS. 7 and 8 are scanning electron microscope (SEM) images of a fractured portion of a polycrystalline compact at 5,000× and 20,000× magnification, respectively.
Figure 8:
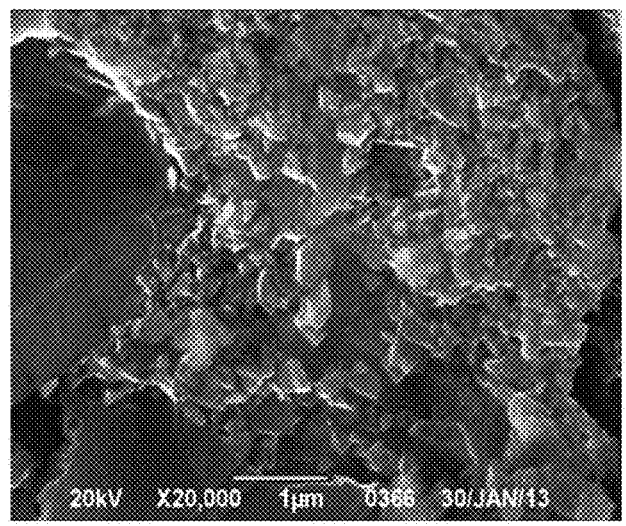

The exposed surface of the split polycrystalline compact was examined under a scanning electron microscope (SEM). Images obtained at 5,000× and 20,000× magnification are shown in FIGS. 7 and 8, respectively. The SEM images appear to show crystals of the c-BN and the AlN well bonded to diamond particle surfaces. Thus, adding aluminum to w-BN appears to promote the bonding of interfaces in the polycrystalline compacts. In the presence of aluminum at a pressure of 8.0 GPa, diamond particles appear to form bonds with the other phases of material present and between each other. Without being bound to any particular theory, this phenomenon may be due to liquid aluminum being a medium through which carbon atoms may be transferred.

Figure 9:
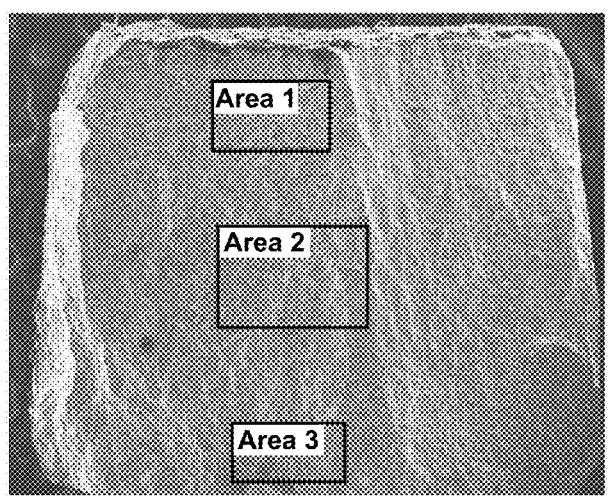
FIG. 9 is a photograph of a fractured portion of a polycrystalline compact showing areas tested by energy-dispersive X-ray spectroscopy (EDS) to measure elemental composition.

The exposed surface of the split polycrystalline compact was subjected to energy-dispersive X-ray spectroscopy (EDS) over three areas of the surface to measure elemental composition. The three areas tested are shown in FIG. 9 as Areas 1, 2, and 3. The elemental compositions detected are shown in Table 1 below.

TABLE 1

Elemental composition of polycrystalline compact (atomic %)

| | B | C | N | Al |
|---|---|---|---|---|
| Area 1 | 10.56% | 78.48% | 10.48% | 0.49% |
| Area 2 | 10.11% | 78.43% | 10.92% | 0.54% |
| Area 3 | 10.28% | 78.02% | 11.56% | 0.44% |

Based on the EDS analysis, the polycrystalline compact appears to have approximately uniform chemical composition, with little variation across the compact.

Three of the polycrystalline compacts were tested to determine some of their physical properties. In particular, sample 1 was sintered for 30 seconds at 1,500° C., sample 2 was sintered for 30 seconds at 1,500° C., followed by sintering for 5 seconds at 1,700° C., and sample 3 was sintered for 30 seconds at 1,500° C., followed by sintering for 7 seconds at 1,700° C. The samples tested to determine their density, Young's modulus, and cutting performance. Young's modulus was measured by sound propagation. Cutting performance was measured by securing the polycrystalline compacts in a lathe and cutting hard alloy rods consisting of 85% tungsten carbide and 15% cobalt. The mass of the rods removed before the polycrystalline compacts failed was measured. This mass indicates relative performance of the polycrystalline compacts, but is not directly comparable to other methods without standardization. The results of the tests are shown in Table 2. The density and Young's modulus of diamond are also shown in Table 2 for reference.

TABLE 2

Physical properties of polycrystalline compacts

| Sample | Sintering temperature (° C.) | Sintering pressure (GPa) | Sintering time (sec) | Density (g/cm$^3$) | Young's modulus (GPa) | Cutting performance (g of hard alloy removed) |
|---|---|---|---|---|---|---|
| 1 | 1,500 | 8.0 | 30 | 3.41 | 785 | 2.7 |
| 2 | 1,500, 1,700 | 8.0 | 30, 5 | 3.43 | 885 | 12.2 |
| 3 | 1,500, 1,700 | 8.0 | 30, 7 | 3.45 | 970 | 11.5 |
| Diamond | | | | 3.52 | 900-1250 | |

Additional non-limiting example embodiments of the disclosure are described below.

Embodiment 1: A polycrystalline compact comprising diamond grains, cubic boron nitride grains, and grains of an additional nitride, carbon or boride. The additional nitride, carbide, or boride is selected from the group consisting of aluminum nitride, gallium nitride, silicon nitride, titanium nitride, silicon carbide, titanium carbide, titanium boride, titanium diboride, and aluminum boride. The diamond grains, the cubic boron nitride grains, and the grains of the additional nitride, carbide, or boride are intermixed and interbonded to form a polycrystalline material.

Embodiment 2: The polycrystalline compact of Embodiment 1, wherein the polycrystalline compact has a density of about 3.40 g/cm$^3$ or greater.

Embodiment 3: The polycrystalline compact of Embodiment 1 or Embodiment 2, wherein the polycrystalline compact has a Young's modulus of about 750 GPa or greater.

Embodiment 4: The polycrystalline compact of any of Embodiments 1 through 3, wherein the diamond grains consist of diamond grains having a grain size from about 1 µm to about 40 µm.

Embodiment 5: The polycrystalline compact of any of Embodiments 1 through 4, wherein the polycrystalline compact comprises from about 70 atomic percent to about 90 atomic percent carbon.

Embodiment 6: The polycrystalline compact of any of Embodiments 1 through 5, wherein the polycrystalline compact comprises from about 5 atomic percent to about 15 atomic percent boron.

Embodiment 7: The polycrystalline compact of any of Embodiments 1 through 6, wherein the polycrystalline compact comprises from about 5 atomic percent to about 15 atomic percent nitrogen.

Embodiment 8: The polycrystalline compact of any of Embodiments 1 through 6, wherein the polycrystalline compact comprises from about 0.1 atomic percent to about 5.0 atomic percent of an element selected from the group consisting of aluminum, gallium, silicon, and titanium.

Embodiment 9: The polycrystalline compact of any of Embodiments 1 through 8, wherein the grains of the additional nitride, carbide, or boride comprise aluminum nitride grains.

Embodiment 10: The polycrystalline compact of any of Embodiments 1 through 9, wherein the polycrystalline compact is substantially free of cobalt, nickel, and iron.

Embodiment 11: An earth-boring tool comprising a bit body and a polycrystalline diamond compact secured to the bit body. The polycrystalline diamond compact comprises diamond grains, cubic boron nitride grains, and grains of an additional nitride, carbide, or boride. The additional nitride, carbide, or boride is selected from the group consisting of aluminum nitride, gallium nitride, silicon nitride, indium nitride, and thallium titanium nitride, silicon carbide, titanium carbide, titanium boride, titanium diboride, and aluminum boride. The diamond grains, the cubic boron nitride grains, and the grains of the additional nitride, carbide, or boride are intermixed and interbonded to form a polycrystalline material.

Embodiment 12: A method of fabricating a polycrystalline compact comprising forming a mixture comprising diamond grains, non-cubic boron nitride grains, and a metal or semimetal; encapsulating the mixture in a container; and subjecting the encapsulated mixture to a pressure of at least 5.0 GPa and a temperature of at least 1,100° C. to form a polycrystalline material from the mixture. The polycrystalline material comprises the diamond grains, cubic boron nitride grains formed from the non-cubic boron nitride grains, and grains of an additional nitride, carbide, or boride selected from the group consisting of aluminum nitride, gallium nitride, silicon nitride, titanium nitride, silicon carbide, titanium carbide, titanium boride, titanium diboride, and aluminum boride. The diamond grains, the cubic boron nitride grains, and the grains of the additional nitride, carbide, or boride are intermixed and interbonded within the polycrystalline material.

Embodiment 13: The method of Embodiment 12, wherein forming the mixture comprising diamond grains, non-cubic boron nitride grains, and the metal or semimetal comprises mixing diamond grains with wurtzitic boron nitride and a metal or semimetal powder.

Embodiment 14: The method of Embodiment 12 or Embodiment 13, wherein forming the mixture comprising diamond grains, non-cubic boron nitride grains, and the metal or semimetal comprises mixing the diamond grains, the non-cubic boron nitride grains, and the metal or semimetal with a solvent.

Embodiment 15: The method of Embodiment 14, further comprising subjecting the diamond grains, the non-cubic boron nitride grains, the metal or semimetal, and the solvent to ultrasonic energy.

Embodiment 16: The method of Embodiment 14 or Embodiment 15, further comprising evaporating the solvent.

Embodiment 17: The method of any of Embodiments 12 through 16, wherein subjecting the encapsulated mixture to the pressure of at least 5.0 GPa and the temperature of at least 1,100° C. comprises converting at least a portion of the boron nitride of the non-cubic boron nitride grains from a wurtzitic phase to a cubic phase.

Embodiment 18: The method of any of Embodiments 12 through 17, wherein forming the mixture comprising diamond grains, non-cubic boron nitride grains, and the metal or semimetal comprises mixing diamond grains with non-cubic boron nitride grains and an aluminum powder.

Embodiment 19: The method of any of Embodiments 12 through 18, wherein subjecting the encapsulated mixture to the pressure of at least 5.0 GPa and the temperature of at least 1,100° C. comprises maintaining the encapsulated mixture at the pressure of at least 5.0 GPa and the temperature of at least 1,100° C. for a period of time from about 1 second to about 5 minutes.

Embodiment 20: The method of any of Embodiments 12 through 19, wherein forming the mixture comprising diamond grains, non-cubic boron nitride grains, and the metal or semimetal comprises grinding at least one of the diamond grains, the non-cubic boron nitride grains, and the metal or semimetal.

Embodiment 21: The method of any of Embodiments 12 through 20, wherein forming the mixture comprising diamond grains, non-cubic boron nitride grains, and the metal or semimetal comprises mixing metal or semimetal particles having an average particle size from about 50 nm to about 50 µm with the diamond grains and the non-cubic boron nitride grains.

Embodiment 22: The method of any of Embodiments 12 through 21, wherein forming the mixture comprising diamond grains, non-cubic boron nitride grains, and the metal or semimetal comprises mixing diamond grains having an average particle size from about 50 nm to about 40 µm with the metal or semimetal and the non-cubic boron nitride grains.

Embodiment 23: The method of any of Embodiments 12 through 22, wherein forming the mixture comprising diamond grains, non-cubic boron nitride grains, and the metal or semimetal comprises mixing non-cubic boron nitride grains having an average particle size from about 1 µm to about 40 µm with the diamond grains and the metal or semimetal.

Embodiment 24: The method of any of Embodiments 12 through 23, wherein subjecting the encapsulated mixture to the pressure of at least 5.0 GPa and the temperature of at least 1,100° C. comprises subjecting the encapsulated mixture to a pressure of at least about 7.5 GPa.

Embodiment 25: The method of any of Embodiments 12 through 24, wherein subjecting the encapsulated mixture to the pressure of at least 5.0 GPa and the temperature of at least 1,100° C. comprises subjecting the encapsulated mixture to a temperature of at least about 1,400° C.

While the present invention has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention as contemplated by the inventors. Further, embodiments of the disclosure have utility with different and various bit profiles as well as cutting element types and configurations.

What is claimed is:

1. A polycrystalline compact, comprising:
   diamond;
   cubic boron nitride; and
   at least one hard material selected from the group consisting of aluminum nitride, gallium nitride, silicon nitride, titanium nitride, silicon carbide, titanium carbide, titanium boride, titanium diboride, and aluminum boride;
   wherein the diamond, the cubic boron nitride, and the hard material are intermixed and interbonded to form a polycrystalline material, and
   wherein the polycrystalline compact at least one of comprises from about 3 atomic percent to about 15 atomic percent boron or has a density of at least about 3.30 g/cm$^3$; and
   wherein the polycrystalline compact comprises at least one composition selected from the group consisting of:
   from about 65 atomic percent to about 95 atomic percent carbon;
   from about 5 atomic percent to about 10 atomic percent boron;
   from about 3 atomic percent to about 15 atomic percent nitrogen; and
   from about 0.05 atomic percent to about 5.0 atomic percent of an element selected from the group consisting of aluminum, gallium, silicon, and titanium.

2. The polycrystalline compact of claim 1, wherein the polycrystalline compact has a density of at least about 3.40 g/cm$^3$.

3. The polycrystalline compact of claim 1, wherein the polycrystalline compact comprises from about 65 atomic percent to about 95 atomic percent carbon.

4. The polycrystalline compact of claim 1, wherein the polycrystalline compact comprises from about 5 atomic percent to about 10 atomic percent boron.

5. The polycrystalline compact of claim 1, wherein the polycrystalline compact comprises from about 3 atomic percent to about 15 atomic percent nitrogen.

6. The polycrystalline compact of claim 1, wherein the polycrystalline compact comprises from about 0.05 atomic percent to about 5.0 atomic percent of an element selected from the group consisting of aluminum, gallium, silicon, and titanium.

7. The polycrystalline compact of claim 1, wherein the at least one hard material selected from the group consisting of aluminum nitride, gallium nitride, silicon nitride, titanium nitride, silicon carbide, titanium carbide, titanium boride, titanium diboride, and aluminum boride comprises aluminum nitride.

8. The polycrystalline compact of claim 1, wherein the polycrystalline compact is substantially free of metallic phases comprising cobalt, nickel, iron, and alloys thereof.

9. A method of fabricating a polycrystalline compact, comprising:
   forming a mixture comprising diamond, non-cubic boron nitride, and a metal or semimetal, the metal or semimetal selected from the group consisting of aluminum, gallium, silicon, and titanium;
   encapsulating the mixture in a container; and
   subjecting the encapsulated mixture to a pressure of at least 5.0 GPa and a temperature of at least 1,100° C. for a period of time from about 1 second to about 5 minutes to form a polycrystalline material from the mixture, the polycrystalline material comprising the diamond, cubic boron nitride formed from the non-cubic boron nitride, and at least one hard material selected from the group consisting of aluminum nitride, gallium nitride, silicon nitride, titanium nitride, silicon carbide, titanium carbide, titanium boride, titanium diboride, and aluminum boride;
   wherein the diamond, the cubic boron nitride, and the hard material are intermixed and interbonded within the polycrystalline material.

10. The method of claim 9, wherein forming the mixture comprising diamond, non-cubic boron nitride, and the metal or semimetal comprises mixing the diamond with the non-cubic boron nitride and aluminum powder.

11. The method of claim 9, wherein forming the mixture comprising diamond, non-cubic boron nitride, and the metal or semimetal comprises mixing diamond having an average particle size from about 50 nm to about 40 µm with the metal or semimetal and the non-cubic boron nitride.

12. The method of claim 9, wherein forming the mixture comprising diamond, non-cubic boron nitride, and the metal or semimetal comprises mixing non-cubic boron nitride having an average particle size from about 1 µm to about 40 µm with the diamond and the metal or semimetal.

13. The method of claim 9, wherein subjecting the encapsulated mixture to the pressure of at least 5.0 GPa and the temperature of at least 1,100° C. comprises subjecting the encapsulated mixture to a pressure of at least about 7.5 GPa.

14. The method of claim 9, wherein subjecting the encapsulated mixture to the pressure of at least 5.0 GPa and the temperature of at least 1,100° C. comprises subjecting the encapsulated mixture to a temperature of at least about 1,400° C.

15. A polycrystalline compact, comprising:
   diamond;
   cubic boron nitride; and
   at least one hard material selected from the group consisting of aluminum nitride, gallium nitride, silicon nitride, titanium nitride, silicon carbide, titanium carbide, titanium boride, titanium diboride, and aluminum boride;
   wherein the diamond, the cubic boron nitride, and the hard material are intermixed and interbonded to form a polycrystalline material, and
   wherein the polycrystalline compact at least one of comprises from about 3 atomic percent to about 15 atomic percent boron or has a density of at least about 3.30 g/cm$^3$; and
   wherein the polycrystalline compact has a Young's modulus of at least about 700 GPa.

16. An earth-boring tool, comprising:
   a bit body; and
   at least one polycrystalline compact secured to the bit body, the polycrystalline compact comprising:
   diamond;
   cubic boron nitride; and
   at least one hard material selected from the group consisting of aluminum nitride, gallium nitride, silicon nitride, titanium nitride, silicon carbide, titanium carbide, titanium boride, titanium diboride, and aluminum boride;

wherein the diamond, the cubic boron nitride, and the hard material are intermixed and interbonded to form a polycrystalline material, and wherein the at least one polycrystalline compact comprises a material having a Young's modulus of at least about 700 GPa; and wherein the polycrystalline compact at least one of comprises from about 3 atomic percent to about 15 atomic percent boron or has a density of at least about 3.30 g/cm$^3$.

17. A method of fabricating a polycrystalline compact, comprising:

forming a mixture comprising diamond, non-cubic boron nitride, and a metal or semimetal, the metal or semimetal selected from the group consisting of aluminum, gallium, silicon, and titanium;

encapsulating the mixture in a container; and subjecting the encapsulated mixture to a pressure of at least 5.0 GPa and a temperature of at least 1,100° C. to convert at least a portion of the non-cubic boron nitride from a wurtzitic phase to a cubic phase and form a polycrystalline material from the mixture, the polycrystalline material comprising the diamond, the wurtzitic phase boron nitride, and at least one hard material selected from the group consisting of aluminum nitride, gallium nitride, silicon nitride, titanium nitride, silicon carbide, titanium carbide, titanium boride, titanium diboride, and aluminum boride;

wherein the diamond, the wurtzitic phase boron nitride, and the hard material are intermixed and interbonded within the polycrystalline material.

18. A method of fabricating a polycrystalline compact, comprising:

forming a mixture comprising diamond, non-cubic boron nitride, and metal or semimetal particles having an average particle size from about 50 nm to about 1μm, the metal or semimetal selected from the group consisting of aluminum, gallium, silicon, and titanium;

encapsulating the mixture in a container; and subjecting the encapsulated mixture to a pressure of at least 5.0 GPa and a temperature of at least 1,100° C. to form a polycrystalline material from the mixture, the polycrystalline material comprising the diamond, cubic boron nitride formed from the non-cubic boron nitride, and at least one hard material selected from the group consisting of aluminum nitride, gallium nitride, silicon nitride, titanium nitride, silicon carbide, titanium carbide, titanium boride, titanium diboride, and aluminum boride;

wherein the diamond, the cubic boron nitride, and the hard material are intermixed and interbonded within the polycrystalline material.

* * * * *

UNITED STATES PATENT AND TRADEMARK OFFICE
CERTIFICATE OF CORRECTION

PATENT NO. : 10,208,542 B2
APPLICATION NO. : 15/297882
DATED : February 19, 2019
INVENTOR(S) : Valery N. Khabashesku and Vladimir P. Filonenko It is certified that error appears in the above-identified patent and that said Letters Patent is hereby corrected as shown below:

In the Specification

Column 9, Line 45, change "the AN and" to --the AlN and--

Signed and Sealed this
Sixteenth Day of April, 2019

Andrei Iancu
*Director of the United States Patent and Trademark Office*